G. B. THOMAS.
CHAIN END.
APPLICATION FILED MAR. 9, 1914.
1,173,896.
Patented Feb. 29, 1916.
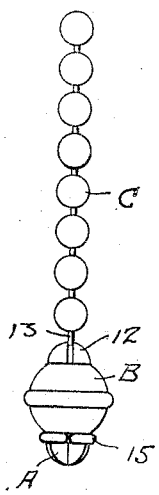
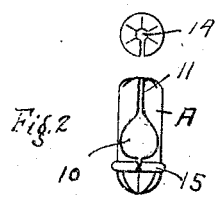
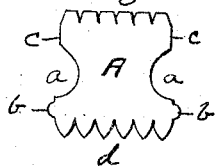
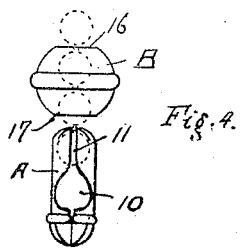
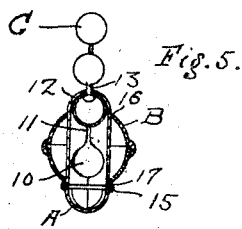
Witnesses:
L. H. Grote
M. E. Keir
Inventor
George B. Thomas
By his Attorneys

UNITED STATES PATENT OFFICE.

GEORGE B. THOMAS, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

CHAIN END.

1,173,896.  Specification of Letters Patent.  Patented Feb. 29, 1916.

Application filed March 9, 1914. Serial No. 823,473.

*To all whom it may concern:*

Be it known that I, GEORGE B. THOMAS, a citizen of the United States of America, and residing at Bridgeport, in the county of Fairfield and State of Connecticut, have invented a certain new and useful Improvement in Chain Ends, of which the following is a specification.

My invention relates to chain ends and particularly to chain ends for ball chains of the type commonly employed to actuate electric pull switches, and the object of my invention is to provide an inexpensive and efficient device of this character.

In the accompanying drawings, Figure 1 is a side elevation of a chain provided with my improved chain end; Fig. 2 is a side elevation of one element of the device; Fig. 3 is a plan of the blank from which said element is formed; Fig. 4 is a detached elevation of the two elements showing the manner in which the device is attached to the chain; and Fig. 5 is a vertical section through the device assembled on the chain.

In the form here shown in explanation of my invention the present chain end comprises two elements, viz., a chain engaging socket A and a gripping element B sleeved thereon. The socket element has a cylindrical body slightly exceeding the diameter of the chain balls C and laterally apertured at 10 to permit the entrance of the end ball of the chain into the interior of the socket. A slot 11 leads from the aperture 10 to the rounded end 12 of the socket, and opens into a small hole 14 of sufficient size to permit free play to the link 13 between the two end balls of the chain. Adjacent the other end of the socket, a shoulder 15 is formed to afford an abutment for the ball B which forms the gripping element of the device. This socket A may be conveniently rolled up from the sheet metal blank shown in Fig. 3 and in which the bays *a* coöperate to form the aperture 10 while the bumps *b* locate the shoulder 15 and serve to space apart the edges *c* to form the slot 11. The ends *d* and *e* are serrated to facilitate the rolling of the metal into the rounded ends of the socket, although this serration is unnecessary. It will be noted that the serrations at *e* are blunted to form the hole 14 for the link 13.

The gripping member comprises a ball B diametrically apertured at 16 and 17 to pass snugly over the socket A.

To assemble the device upon a chain, the gripping element B is passed up over the free end of the chain, the end ball of the latter inserted in the aperture 10 of the socket and run down into the end of the socket so that the link 13 plays in the hole 14. The chain and socket being now alined, the ball B is brought down on the chain and passed onto the socket until halted by the shoulder 15. The holes in the ball B are of slightly less diameter than the socket A and the latter is consequently sufficiently compressed to hold the two elements frictionally together against accidental separation. Obviously the chain ball cannot escape the socket until the gripping element B is slipped off the socket.

Various modifications of the structure shown will readily suggest themselves.

I claim as my invention:—

1. A device of the character described comprising a socket element adapted to receive the end ball of a chain, in combination with an enlarged gripping element sleeved upon said socket element to prevent the escape of the chain ball therefrom.

2. A device of the character described comprising a socket element laterally apertured to admit the end ball of a chain and slotted to permit its link to pass to axial position at one end of said socket element, in combination with an enlarged gripping element sleeved upon said socket and closing the lateral aperture thereof to prevent the escape of the chain ball therefrom in the assembled position of the parts.

3. A device of the character described comprising a cylindrical socket element apertured to admit the end ball of a chain and slotted to permit the chain link to pass to axial position at one end of said socket element, an external shoulder on the latter, in combination with an enlarged chain terminal element sleeved upon said socket in assembled position and abutting against said shoulder on the socket element to prevent endwise separation of said parts when the chain is tensioned by pull upon said gripping element.

4. A device of the character described comprising a socket element apertured to receive the end ball of a chain and slotted to permit the chain link to pass to axial position at one end of said socket element, in combination with an enlarged ball-like gripping element axially apertured at opposite ends to pass freely over the chain during the adjustment of the end chain ball in the socket and being sleeved upon said socket in the completely assembled condition of the device, to prevent the escape of the chain ball from the socket element.

5. In a chain end device of the character described, a socket element comprising a cylindrical sheet metal body apertured to admit the end ball of a chain and longitudinally slotted to permit its link to pass to axial position at one end of said socket, together with an external shoulder on said socket to afford an abutment in combination with an enlarged gripping element sleeved upon and frictionally engaging said socket and serving to prevent the escape of the chain ball from the socket element while the parts are in assembled position, for the purpose described.

In testimony whereof I have signed my name to this specification, in the presence of two subscribing witnesses.

GEORGE B. THOMAS.

Witnesses:
G. W. GOODRIDGE,
H. M. WICHERT.